(12) United States Patent
Drummer

(10) Patent No.: US 9,028,936 B2
(45) Date of Patent: May 12, 2015

(54) HOUSING SHELL FOR PORTABLE ELECTRICAL DEVICES AND METHOD FOR THE PRODUCTION THEREOF

(75) Inventor: Dietmar Drummer, Neuendettelsau (DE)

(73) Assignee: Oechsler Aktiengesellschaft, Ansbach (DE)

( * ) Notice: Subject to any disclaimer, the term of this patent is extended or adjusted under 35 U.S.C. 154(b) by 557 days.

(21) Appl. No.: 13/257,612

(22) PCT Filed: Apr. 6, 2010

(86) PCT No.: PCT/EP2010/002156
§ 371 (c)(1),
(2), (4) Date: Nov. 21, 2011

(87) PCT Pub. No.: WO2010/127749
PCT Pub. Date: Nov. 11, 2010

(65) Prior Publication Data
US 2012/0074007 A1 Mar. 29, 2012

(30) Foreign Application Priority Data
May 4, 2009 (DE) .......................... 10 2009 019 495
Nov. 30, 2009 (DE) .......................... 10 2009 056 124

(51) Int. Cl.
*B29D 22/00* (2006.01)
*B29D 23/00* (2006.01)
(Continued)

(52) U.S. Cl.
CPC ..... *B29C 45/14786* (2013.01); *B29C 45/14221* (2013.01); *B29C 45/14811* (2013.01);
(Continued)

(58) Field of Classification Search
CPC ............ B29C 45/14786; B29C 51/145; B29L 2031/3481; B29D 22/00; B29D 23/00; B32B 1/08
USPC .......................................... 428/35.7; 206/320
See application file for complete search history.

(56) References Cited

U.S. PATENT DOCUMENTS

| | | | |
|---|---|---|---|
| 3,765,998 A | 10/1973 | Oswald et al. | |
| 4,469,543 A | 9/1984 | Segal et al. | |

(Continued)

FOREIGN PATENT DOCUMENTS

| | | |
|---|---|---|
| CA | 2276746 A1 | 7/1998 |
| CN | 101181888 A | 5/2008 |

(Continued)

OTHER PUBLICATIONS

International Preliminary Report on Patentability issued in connection with PCT International Application No. PCT/EP2010/002156 (corrected version—5 pages).

(Continued)

*Primary Examiner* — Michael C Miggins
(74) *Attorney, Agent, or Firm* — Buchanan Ingersoll & Rooney PC

(57) ABSTRACT

A housing shell for electrical measuring, controlling and communication devices, in particular the lower housing part of a cellphone, has very great flexural and torsional rigidity in spite of an extremely small wall thickness if it is formed as a part created by a forming operation from the planar blank of a thermoplastically impregnated long-fibered multi-layered mat. Fine-membered functional elements of likewise thermoplastic material are then molded onto the housing shell in an injection mold.

11 Claims, 1 Drawing Sheet

(51) Int. Cl.
    *B32B 1/08*      (2006.01)
    *B29C 45/14*     (2006.01)
    *B29C 49/70*     (2006.01)
    *B29C 51/00*     (2006.01)
    *B29C 51/14*     (2006.01)
    *B29C 70/46*     (2006.01)
    *B29C 45/00*     (2006.01)
    *B29K 105/08*    (2006.01)
    *B29L 9/00*      (2006.01)
    *B29L 31/30*     (2006.01)
    *B29L 31/34*     (2006.01)

(52) U.S. Cl.
    CPC .............. *B29C49/70* (2013.01); *B29C 51/004*
        (2013.01); *B29C 51/145* (2013.01); ***B29C
        70/46*** (2013.01); *B29C 2045/0093* (2013.01);
        *B29C 2045/14237* (2013.01); *B29C 2045/14245*
        (2013.01); *B29C 2045/14459* (2013.01); *B29K
        2105/0845* (2013.01); *B29K 2713/00* (2013.01);
        *B29K 2995/0087* (2013.01); *B29L 2009/006*
        (2013.01); *B29L 2031/3061* (2013.01); *B29L
        2031/3431* (2013.01); *B29L 2031/3437*
        (2013.01); *B29L 2031/3481* (2013.01)

(56) References Cited

U.S. PATENT DOCUMENTS

| | | | |
|---|---|---|---|
| 6,682,675 | B1 | 1/2004 | Vandangeot et al. |
| 7,980,587 | B2 | 7/2011 | Chen et al. |
| 2002/0106952 | A1 | 8/2002 | Hashizume et al. |
| 2002/0167113 | A1 | 11/2002 | Vendangeot et al. |
| 2003/0111940 | A1* | 6/2003 | Lai et al. .................... 312/223.2 |
| 2003/0157262 | A1* | 8/2003 | Cebola .......................... 427/421 |
| 2004/0062943 | A1 | 4/2004 | Naritomi et al. |
| 2005/0272487 | A1 | 12/2005 | Lee |
| 2006/0216469 | A1 | 9/2006 | Hashizume et al. |
| 2007/0035739 | A1* | 2/2007 | Tung ............................. 356/445 |
| 2007/0199797 | A1 | 8/2007 | Sell et al. |
| 2008/0288701 | A1* | 11/2008 | Ward et al. ..................... 710/303 |
| 2009/0146402 | A1 | 6/2009 | Chen et al. |
| 2011/0233904 | A1 | 9/2011 | Chen et al. |

FOREIGN PATENT DOCUMENTS

| | | |
|---|---|---|
| CN | 101340469 A | 1/2009 |
| DE | 82 02 486.3 U1 | 9/1982 |
| DE | 197 07 437 A1 | 8/1998 |
| DE | 197 17 505 A1 | 11/1998 |
| DE | 101 12 635 A1 | 11/2001 |
| DE | 10 2004 027 606 A1 | 11/2005 |
| DE | 102009019495 A1 | 11/2010 |
| EP | 1 219 401 A2 | 7/2002 |
| TW | 200539778 A | 12/2005 |
| TW | I286969 B | 9/2007 |
| TW | 200736032 A | 10/2007 |

OTHER PUBLICATIONS

International Search Report (PCT/ISA/210) for PCT/EP2010/002156 dated Jul. 8, 2010.
Partial Written Opinion (PCT/ISA/237) for PCT/EP2010/002156 dated Jul. 8, 2010.
Partial International Preliminary Report on Patentability (PCT/IPEA/409) for PCT/EP2010/002156 dated Jul. 2010.

* cited by examiner

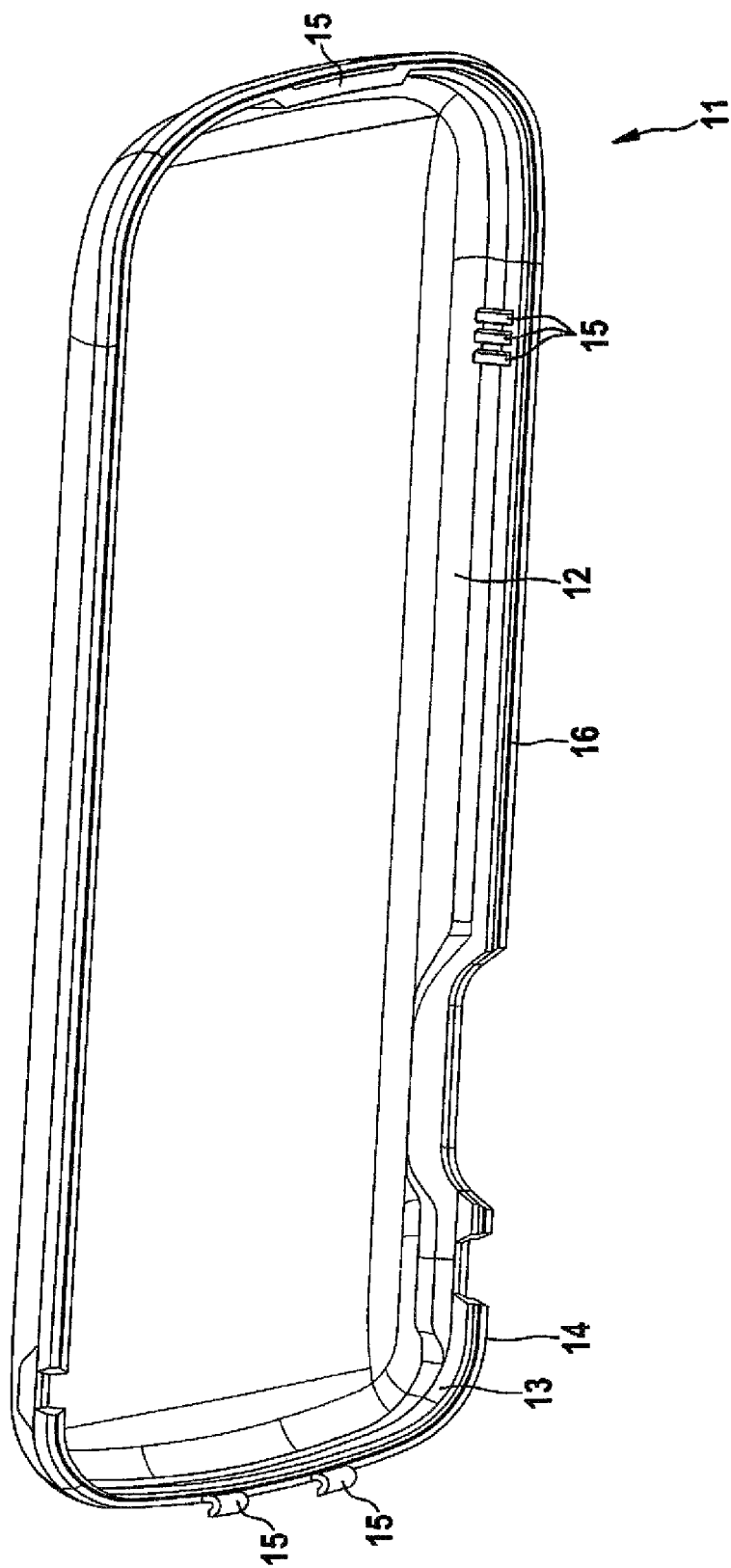

HOUSING SHELL FOR PORTABLE ELECTRICAL DEVICES AND METHOD FOR THE PRODUCTION THEREOF

The invention relates to a housing shell and a method for the production thereof.

DE 1 97 07 437 A1 discloses a housing shell for the multipart housing of a lightweight radio remote control for use in model aircraft construction. Because thermoplastic injection molding does not allow material thicknesses, and consequently weights, to go below certain limits for technical reasons, a particularly lightweight but nevertheless sufficiently rigid housing shell is thermoformed from a film blank made to correspond to the finished contour. The thermoforming film used for this comprises ABS, a thermoformable, toughened polystyrene, which however does not provide the handheld device with a particularly pleasant feel.

Such a molded part in the form of the ABS housing shell also does not satisfy current requirements for particularly flat handheld devices with regard to low weight brought about by small wall thicknesses, with nevertheless increased mechanical strength, such as in particular high flexural and torsional rigidity of their housing shells. In addition, structural stiffening elements in the form of ribs that are molded into the interior of the flat housing shell when it is made or are subsequently fitted are ruled out because they would unacceptably reduce the space for installing electronic components that is available in the housing shell, which is in any case only a shallow space.

While not concerning handheld devices that meet demanding requirements in terms of feel but functional parts on bodies of vehicles such as the boot space recess for receiving a spare wheel, DE 1 01 12 635 A1 discloses the molding of a thermoplastic composite material intended for later fastening to the body together with a thermoplastic glass fiber sandwich material intended to withstand greater loads, in particular thermoforming the two materials in a die while they are at the same time fused together. For this purpose, a predetermined amount of thermoplastic material is applied to the sandwich blank and molded and fused together with the blank as the shaping takes place in the die; however, this does not produce a thin and uniform wall structure. Examples of the lamination of thermoplastically impregnated glass fiber mats for hot or cold forming or for punching out for decorative and structural parts on bodies of vehicles are described in more detail in U.S. Pat. No. 3,765,998 and U.S. Pat. No. 4,469,543.

Shaping of a sandwich structure while adding thermoplastic material is unsuitable for producing thin, flat housing shells if only because of the resultant great and irregular wall thicknesses. This is so because the devices of interest here are, for instance, remote control devices in the automotive or entertainment electronics sector and, in particular, radio receivers such as cordless phones or cellphones. Ensuring dimensional stability even under functional mechanical loading is of particular importance here along with functional mobility of individual housing parts in relation to one another, as in the case of what is known as a slider phone, cf. DE 10 2004 027 606 A1. However, it is also the intention in the case of a desktop or standalone device, for instance in the form of a console housing (cf. DE 82 02486 U1), that the upper housing part should not noticeably deform under mechanical loading, but always form a tight seal where it joins the base unit.

Aware of the circumstances described, the present invention addresses the technical problem of providing particularly flat and lightweight but nevertheless dimensionally more stable housing shells of improved feel and appearance.

To solve this problem, it could be considered to produce housing shells from injection-molded sintered ceramic; however, this production technology is comparatively costly and, because of the brittle material behavior, the product is not sufficiently resistant to impact for many applications. Metal housing shells for handheld devices are often ruled out in practice because they are not sufficiently pleasant to the touch without a special outer coating. Furthermore, they are not sufficiently transparent to radio frequency for radio remote controls, RFID transponder applications (e.g. according to DE 1 97 17 505 C2) and communication devices; and the installation of electronic components sometimes requires separate local insulating measures, such as paint coatings or plastic linings on the inner wall surface of the metal shell.

Instead, the problem is solved according to the invention by the features of the main claim. These provide that the housing shell substantially consists of a component which is configured in a flat form in a way known per se under the effect of heat and pressure from a mat of woven or laid fabric that has been cut to correspond to the actual contour and has a thermoplastically impregnated, at least two-layered long-fibered surface structure. The wall thickness thereof may be down to 1.0 mm, or even just 0.5 mm.

The criss-crossing fibers of the initially planar mat blank are preferably intertwined in a weave or knit and oriented in their directions of extent to withstand the expected mechanical loading of the finished formed part, in particular a housing shell. The fibers may be carbon fibers; for desirable radio frequency transparency of the housing shell, however, glass fibers or fibers of particularly tear-resistant aromatic polyamides (aramid) are preferred.

The thermoplastic impregnation of such woven or laid fiber structures takes place with inexpensively available thermoplastic materials, preferably urethane-based elastomers or polyamides; however, amorphous terpolymers or impact-resistant polycarbonate can also be advantageously used.

The formed part is preferably an uninterrupted lower housing shell. However, interruptions are also possible, for instance for inserting plug sockets, displays or pushbutton switches. Interruptions may already be contained in the flat blank of the impregnated woven or laid fiber mat that is still to be formed, or they are punched out from it during the forming operation. They may, however, also be introduced into the formed part only after the thermoforming process, for instance in order to satisfy more stringent requirements in terms of precision and decorative effects.

Although the free front edges of the peripheral side borders of the housing shell do not necessarily comply to the desired dimensions after the forming operation, that can be easily corrected by trimming to functional requirements. More problematic is the formation of fine-membered functional elements on the formed part. While displacing guides in the form of continuous ribs or grooves can sometimes be introduced during the forming operation, that is often not possible, or at least not readily possible, in the case of functional elements that are only intended to be arranged locally, such as soft-elastic sealing and decorative frames, or in the case of hard-elastic snap-fitting or locking-in elements (barb tongues and engagement openings), mounting pillars or hinge bolts and eyelets.

It could be considered for this purpose to apply locally to the mat blank that is to be formed into the housing shell additional polymer compounds which are shaped to form the functional elements during the forming operation. But that would lead to an impairment of the properties of the mat in the vicinity of such discontinuities on account of locally greatly increased wall thicknesses; and it would still not be ensured that the mechanical-thermal operation of forming such local additional materials would produce fine-membered functional elements that are formed sufficiently exactly to geometrical requirements.

Therefore, the housing shell according to the invention has functional elements which are not formed on it during the forming operation but are only molded onto the already shaped housing shell after the latter has been placed in an injection mold; to be specific they are applied in said mold by being injection-molded from likewise thermoplastic material at any structurally required location, in order then, as they cure, to firmly bond with the formed part that has begun to melt locally during the injection-molding operation.

The thermoforming of the planar polymer blank into the three-dimensionally distorted, extremely flat housing shell produces a particularly pleasing feel just on the basis of the smoothly rounded transitions. However, the outer surface of the housing shell can, for instance, be further optimized in terms of feel, design and function by means of film coating or vacuum metallizing. This is so because it has been found with such a formed part that, after shrinkage that occurs upon cooling down, the semifinished structures of the hot-pressed fiber composite appear on the surfaces of the housing shell as unsightly, slightly pitted unevennesses. For exterior surface regions that are not susceptible to soiling since they are continuously smooth and shiny, as may also be desired for reasons of feel or for visible surfaces on the formed part, an additional function-optimizing surface finishing is therefore appropriate.

Suitable for this in principle is the laminated application of finishing films. However, this is problematic because of the rounded transition to the side borders of the formed part caused by the compression molding, because it is critical here that the film is attached all the way around in such a way that it cannot peel off; in addition, the film must be relatively thick in order that the uneven surface of the housing shell does not leave an impression through it. Vacuum metallizing would also reproduce the undesired surface profile of the hot-pressed shaped part.

Aware of these circumstances, the present invention optionally also addresses the further technical problem of improving the surface quality in terms of feel and appearance of the housing shell compression-molded from a fiber composite prepreg.

A desirable surface quality for visible surfaces or surfaces to be handled, in terms of a smooth, shiny surface, is achieved according to this development of the invention by a preferably multi-layered paint coat, which according to requirements is regionally limited or else applied over the full area. The relatively thickly applied primer coat of said paint coat acts as a bonding agent with the substrate, that is to say on the outer surface of the housing shell, and at the same time serves for sizing the surface, so that the uneven pitted structure thereof is no longer such a significant factor after the primer coat. In at least one further layer, color pigments are applied in their binders to the primer coat, and finally a transparent top coat is applied thereto, producing the desired gloss and at the same time the light fastness of the coloration.

The viscosity of the paint solvent can in this case be set in accordance with the specifications for the surface and with regard to the size and topography of the surface region to be improved, in order in this way to achieve, by means of the flow properties, rapid, uniform wetting and, as a result, homogeneous optical properties over the entire prescribed surface region, so that this formed part can also be used as an optical component.

According to an additional development of the invention, particularly for surface regions that have to withstand higher mechanical loads, and so have to be harder, the use of, preferably solvent-free, multi-component, in particular two-component, paint is preferred for producing the gloss layer, since, on the basis of the chemical reaction of its components, such a paint sets on the surface directly coated with it, or else on the primer coat, without any drying requirements.

This creates parts of housings for electrical measuring, controlling and communication devices, in particular lower housing part/housing shells for cellphones which, with outstanding feel and appearance, have very great flexural and torsional rigidity in spite of an extremely small wall thickness, by formed parts being mechanically-thermally shaped from planar blanks of thermoplastically impregnated long-fibered multi-layered woven or laid fabric mats, with fine-membered functional elements thermoplastically molded onto the housing shell that has been brought into an injection mold after the forming operation, and possibly with final painting of the outer surfaces of the housing shell.

To illustrate the invention more specifically, a flat thermoformed shell of the type according to the invention that can be used in particular as the rear side of the housing of a handheld device is depicted in the drawing, approximately to scale, said shell having a wall thickness of well below 1 mm but proving to be significantly more flexurally rigid than a housing shell of the same dimensions that is comparatively soft and can become warped relatively easily which has been produced in a conventional way completely by the plastics injection-molding process, with a wall thickness of over 2 mm.

The thermoformed housing shell 11, which is represented in an oblique view of its inside and is very flat in relation to its cross-sectional dimensions, has a very gently curved wall 12, which merges all the way around with flat side borders 13, which end with a small radius approximately orthogonally in relation to the wall 12. After the cured thermoforming operation, the front edges 14 of said borders are trimmed to functional requirements, as can be seen from their extent along the border.

After the border trimming mentioned, for later interaction of the housing shell 11 with another housing part (not depicted), the side borders 13 of said thermoformed and cured housing shell 11 are provided with hard-elastic functional elements 15, such as the sketched locking hooks, in a plastics injection-molding process, but also the peripheral front edge 14 of the side borders 13 is provided with a decorative or sealing frame 16 of a thermoplastic material that is more soft-elastic than the material of the thermoformed part (wall 12 with side borders 13) and of a contrasting color.

The invention claimed is:

1. A flat housing shell for portable, personal electrical devices, the housing shell being thermoformed from a planar mat out of thermoplastically impregnated multi-layered criss-crossing long fibers, with functional elements molded-on by injection molding from thermoplastic material, wherein a decorative or sealing frame from thermoplastic material that is more soft-elastic than the material of the thermoformed part and of a contrasting color is injection-molded on a peripheral front edge of the housing shell and the injection-molded material for the functional elements has a different elasticity than the material of the rest of the housing shell, wherein the housing shell bears a multi-layered paint coating applied to its outer surface, and wherein a primer coat of the multi-layered paint coating reduces unevenness caused by a structure of the mat.

2. The housing shell as claimed in claim 1, wherein its wall thickness is around or below 1 millimeter.

3. The housing shell as claimed in claim 1, wherein its outer surface is optimized in terms of design and function by means of film coating.

4. The housing shell as claimed in claim 1, wherein at least one pigment layer is applied to the primer coat and is covered over by a transparent paint layer.

5. The housing shell as claimed claim 1, wherein the multi-layered paint coating comprises a multi-component paint that sets immediately as a result of chemical reaction.

6. The housing shell as claimed in claim 1, wherein the fibers of the mat are oriented in their extent to withstand mechanical loads.

7. The housing shell as claimed in claim 1, wherein the mat contains carbon fibers, or for improved radio frequency transparency glass fibers or fibers of tear-resistant aromatic polyamides (aramid).

8. The housing shell as claimed in claim 1, wherein the mat is impregnated with urethane-based elastomers, polyamides, amorphous terpolymer or impact-resistant polycarbonate.

9. The housing shell as claimed in claim 1, wherein its outer surface is optimized in terms of design and function by means of vacuum metallizing.

10. The housing shell as claimed in claim 1, wherein the fibers of the mat are intertwined in a weave or knit.

11. A method for producing a housing shell for portable, personal electrical devices as claimed in claim 1, by impregnating a mat of multi-layered crossing long fibers with thermoplastic material, cutting the cured mat to size according to the contour of a thermoforming mold and three-dimensionally deforming the cut-to-size mat mechanically-thermally in said mold, whereupon functional elements are molded on this housing shell after it has been brought into an injection mold and a decorative or sealing frame is molded onto the peripheral front edge of the side borders from thermoplastic material that is more soft-elastic than the material of the thermoformed part and of a contrasting color.

* * * * *